US011862084B2

(12) United States Patent
Song et al.

(10) Patent No.: US 11,862,084 B2

(45) Date of Patent: Jan. 2, 2024

(54) PIXEL CIRCUIT, DRIVING METHOD, DISPLAY SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Erlong Song, Beijing (CN); Kai Zhang, Beijing (CN); Xingrui Cai, Beijing (CN); Yagui Gao, Beijing (CN); Hailong Yan, Beijing (CN); Xinyu Wei, Beijing (CN); Qiang Fu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 193 days.

(21) Appl. No.: 17/434,709

(22) PCT Filed: Nov. 30, 2020

(86) PCT No.: PCT/CN2020/132711

§ 371 (c)(1),
(2) Date: Aug. 27, 2021

(87) PCT Pub. No.: WO2022/110124

PCT Pub. Date: Jun. 2, 2022

(65) Prior Publication Data

US 2023/0162674 A1 May 25, 2023

(51) Int. Cl.

*G09G 3/3233* (2016.01)
*G09G 3/20* (2006.01)

(52) U.S. Cl.

CPC ......... *G09G 3/3233* (2013.01); *G09G 3/2007* (2013.01); *G09G 2300/0408* (2013.01);

(Continued)

(58) Field of Classification Search

None

See application file for complete search history.

(56) References Cited

U.S. PATENT DOCUMENTS

2009/0121981 A1 5/2009 Yoo et al.
2015/0348462 A1 12/2015 Ma (Continued)

FOREIGN PATENT DOCUMENTS

CN 103985352 A 8/2014
CN 104575372 A 4/2015

(Continued)

*Primary Examiner* — Matthew Yeung

(74) *Attorney, Agent, or Firm* — IPro, PLLC

(57) ABSTRACT

A pixel circuit, a driving method, a display substrate, and a display device are provided. The pixel circuit includes a driving circuit, a first light-emitting control circuit, a light-emitting element, a first initialization circuit, and a second initialization circuit. The first initialization circuit writes, under the control of a first initialization control signal, an initialization voltage provided by an initialization voltage line, to a control terminal of the driving circuit; the second initialization circuit writes, under the control of a second initialization control signal provided by a second initialization control line, an initial data voltage provided by an initial data line, to an anode of the light-emitting element. Light emission of the light-emitting element from a leakage current and lateral leakage at low gray scales caused when initializing the anode of the light-emitting element can be prevented.

10 Claims, 14 Drawing Sheets

(52) U.S. Cl.
CPC ............... *G09G 2300/0819* (2013.01); *G09G 2300/0842* (2013.01)

(56) References Cited

U.S. PATENT DOCUMENTS

| | | | | |
|---|---|---|---|---|
| 2016/0055797 | A1 | 2/2016 | Tan et al. | |
| 2016/0063922 | A1 | 3/2016 | Tsai et al. | |
| 2017/0193896 | A1* | 7/2017 | Kim | G09G 3/325 |
| 2017/0301293 | A1 | 10/2017 | Zhu et al. | |
| 2018/0240400 | A1 | 8/2018 | Zhou et al. | |
| 2019/0073955 | A1* | 3/2019 | Zou | G09G 3/3258 |
| 2019/0221165 | A1* | 7/2019 | Park | H10K 59/131 |
| 2020/0388214 | A1 | 12/2020 | Yang | |

FOREIGN PATENT DOCUMENTS

| | | | |
|---|---|---|---|
| CN | 106558287 | A | 4/2017 |
| CN | 107452331 | A | 12/2017 |
| CN | 107680537 | A | 2/2018 |

* cited by examiner

PIXEL CIRCUIT, DRIVING METHOD, DISPLAY SUBSTRATE AND DISPLAY DEVICE

CROSS-REFERENCE TO RELATED APPLICATION

This application is the U.S. national phase of PCT Application No. PCT/CN2020/132711 filed on Nov. 30, 2020, the disclosure of which is incorporated in its entirety by reference herein.

TECHNICAL FIELD

The present disclosure relates to the field of display technologies, and in particular to a pixel circuit, a driving method, a display substrate, and a display device.

BACKGROUND

As the active matrix organic light emitting diode (Active Matrix Organic light Emitting Diode, AMOLED) display technology continuously develops, in order to adapt to a more complex display environment, pixel definition layers (PDL) are gradually increased, resulting in gradually decreased gaps (PDL Gap) among the pixel definition layers. In addition, efficiency of the organic light emitting diode (OLED) device is gradually improved and its turn-on voltage is reduced. The above factors cause the anode node of the OLED device to get more and more attention.

SUMMARY

In an aspect, embodiments of the present disclosure provide a pixel circuit, including a driving circuit, a first light-emitting control circuit, a light-emitting element, a first initialization circuit, and a second initialization circuit;

where the driving circuit is configured to generate, under the control of a control terminal of the driving circuit, a driving current for driving the light-emitting element, and a cathode of the light-emitting element is electrically connected to a first voltage line;

where the first light-emitting control circuit is electrically connected to a light-emitting control line, the driving circuit, and an anode of the light-emitting element, and is configured to control, under the control of a light-emitting control signal provided by the light-emitting control line, the driving circuit to be connected to or disconnected from the anode of the light-emitting element;

where the first initialization circuit is electrically connected to a first initialization control line, the control terminal of the driving circuit, and an initialization voltage line, and is configured to write, under the control of a first initialization control signal provided by the first initialization control line, an initialization voltage provided by the initialization voltage line, to the control terminal of the driving circuit;

where the second initialization circuit is electrically connected to a second initialization control line, the anode of the light-emitting element, and an initial data line, and is configured to write, under the control of a second initialization control signal provided by the second initialization control line, an initial data voltage provided by the initial data line, to the anode of the light-emitting element.

Optionally, the second initialization circuit includes a first transistor;

where a gate electrode of the first transistor is electrically connected to the second initialization control line, a first electrode of the first transistor is electrically connected to the initial data line, and a second electrode of the first transistor is electrically connected to the anode of the light-emitting element.

Optionally, the first initialization circuit includes a second transistor;

where a gate electrode of the second transistor is electrically connected to the first initialization control line, a first electrode of the second transistor is electrically connected to the initialization voltage line, and a second electrode of the second transistor is electrically connected to the control terminal of the driving circuit.

Optionally, the pixel circuit described in at least one embodiment of the present disclosure further includes a second light-emitting control circuit, a storage circuit, a data writing circuit, and a compensation circuit, where the first light-emitting control circuit is electrically connected to a second terminal of the driving circuit;

where the second light-emitting control circuit is electrically connected to the light-emitting control line, a second voltage line, and a first terminal of the driving circuit, and is configured to control, under the control of the light-emitting control signal, the first terminal of the driving circuit to be connected to or disconnected from the second voltage line;

where the storage circuit is electrically connected to the control terminal of the driving circuit, and is configured to maintain a potential of the control terminal of the driving circuit;

where the data writing circuit is electrically connected to the gate line, a display data line, and the first terminal of the driving circuit, and is configured to write, under the control of a gate driving signal, a display data voltage on the display data line, to the first terminal of the driving circuit;

where the compensation circuit is electrically connected to the gate line, the control terminal of the driving circuit, and the second terminal of the driving circuit, and is configured to control, under the control of the gate driving signal, the control terminal of the driving circuit to be connected to or disconnected from the second terminal of the driving circuit.

Optionally, the driving circuit includes a driving transistor, a gate electrode of the driving transistor is the control terminal of the driving circuit, a first electrode of the driving transistor is the first terminal of the driving circuit, and a second electrode of the driving transistor is the second terminal of the driving circuit;

where the first light-emitting control circuit includes a third transistor; a gate electrode of the third transistor is electrically connected to the light-emitting control line, a first electrode of the third transistor is electrically connected to the second electrode of the driving transistor, and a second electrode of the third transistor is electrically connected to the anode of the light-emitting element;

where the second light-emitting control circuit includes a fourth transistor, a gate electrode of the fourth transistor is electrically connected to the light-emitting control line, a first electrode of the fourth transistor is electrically connected to the second voltage line, and a second electrode of the fourth transistor is electrically connected to the first electrode of the driving transistor;

where the storage circuit includes a storage capacitor, a first electrode plate of the storage capacitor is electrically connected to the gate electrode of the driving transistor, and a second electrode plate of the storage capacitor is electrically connected to the second voltage line;

where the data writing circuit includes a fifth transistor, a gate electrode of the fifth transistor is electrically connected to the gate line, a first electrode of the fifth transistor is electrically connected to the display data line, and a second electrode of the fifth transistor is electrically connected to the first electrode of the driving transistor;

where the compensation circuit includes a sixth transistor, a gate electrode of the sixth transistor is electrically connected to the gate line, a first electrode of the sixth transistor is electrically connected to the gate electrode of the driving transistor, and a second electrode of the sixth transistor is electrically connected to the second electrode of the driving transistor.

In a second aspect, embodiments of the present disclosure also provide a driving method, which is applied to the above-mentioned pixel circuit, and the driving method includes:

writing, by the first initialization circuit, under the control of the first initialization control signal, the initialization voltage provided by the initialization voltage line, to the control terminal of the driving circuit; and writing, by the second initialization circuit, under the control of the second initialization control signal, the initial data voltage provided by the initial data line, to the anode of the light-emitting element.

Optionally, the pixel circuit further includes a data writing circuit, the pixel circuit is included in a display panel, and the driving method further includes: writing, by the data writing circuit, a display data voltage on a display data line to the driving circuit, under the control of a gate driving signal on a gate line; wherein:

a minimum display data voltage among all display data voltage connected to all pixel circuits in the display panel is greater than a predetermined gray-scale voltage, and the initial data voltage is the same as a first voltage provided by the first voltage line; or, a minimum display data voltage among all display data voltage connected to all pixel circuits in the display panel is less than a predetermined gray-scale voltage, the initial data voltage is different from a first voltage provided by the first voltage line, an absolute value of a difference between the initial data voltage and the first voltage is less than a predetermined voltage value, the difference between the initial data voltage and the first voltage is smaller than a turn-on voltage of the light-emitting element, and the predetermined voltage value is a positive value.

In a third aspect, embodiments of the present disclosure also provide a display substrate, which includes a base substrate and the above-mentioned pixel circuit on the base substrate.

Optionally, the pixel circuit includes a driving transistor and a storage capacitor, and the display substrate further includes an initial data line on the base substrate;

where a gate electrode of the driving transistor is further used as a first electrode plate of the storage capacitor;

where the initial data line and the gate electrode of the driving transistor are in a same layer and are made of a same material, or, the initial data line and a second electrode plate of the storage capacitor are in a same layer and are made of a same material.

Optionally, the display substrate further includes a gate line on the base substrate;

where an extension direction of the initial data line is the same as an extension direction of the gate line.

Optionally, the display substrate further includes a display data line on the base substrate;

where the initial data line and the display data line are in a same layer and are made of a same material, or, the initial data line is on a side of the display data line away from the base substrate.

Optionally, an extension direction of the initial data line is the same as an extension direction of the display data line.

Optionally, the pixel circuit includes a first transistor, and the display substrate further includes the second initialization control line and the initial data line on the base substrate;

where a gate electrode of the first transistor and a gate electrode of the driving transistor are in a same layer and are made of a same material, and the gate electrode of the first transistor is electrically connected to the second initialization control line;

where a first electrode of the first transistor, a second electrode of the first transistor, a first electrode of the driving transistor, and a second electrode of the driving transistor are in a same layer and are made of a same material;

where the first electrode of the first transistor is electrically connected to the initial data line, and the second electrode of the first transistor is electrically connected to the anode of the light-emitting element.

Optionally, the pixel circuit includes a driving transistor and a storage capacitor;

where a gate electrode of the driving transistor is further used as a first electrode plate of the storage capacitor;

where the initialization voltage line and the gate electrode of the driving transistor are in a same layer and are made of a same material, or, the initialization voltage line and a second electrode plate of the storage capacitor are in a same layer and are made of a same material.

Optionally, the display substrate further includes a gate line on the base substrate;

where an extension direction of the initialization voltage line is the same as an extension direction of the gate line.

In a fourth aspect, embodiments of the present disclosure also provide a display device including the above-mentioned display substrate.

Optionally, the display device described in at least one embodiment of the present disclosure further includes a driving chip and an initial data wire, a first voltage line and a second voltage wire, where the initial data wire, the first voltage line and the second voltage wire are outside an active area of the base substrate;

where the initial data wire includes a first initial data wire portion directly electrically connected to the driving chip;

where the first voltage line includes a first voltage line portion directly electrically connected to the driving chip, and the second voltage wire includes a first voltage wire portion directly electrically connected to the driving chip;

where the first initial data wire portion is between the first voltage line portion and the first voltage wire portion.

Optionally, the first initial data wire portion, the first voltage line portion, and the first voltage wire portion all extend in a second direction;

where the second direction is a direction in which the display data line extends.

Optionally, the display device according to at least one embodiment of the present disclosure further includes a driving chip, an initial data wire, an initialization voltage wire, a first voltage line, and a second voltage wire, where the initial data wire, the initialization voltage wire, the first voltage line, and the second voltage wire are outside an active area of the base substrate;

where the initial data wire includes a first initial data wire portion directly electrically connected to the driving chip;

where the initialization voltage wire includes a first initialization voltage wire portion directly electrically connected to the driving chip;

where the first voltage line includes a first voltage line portion directly electrically connected to the driving chip, and the second voltage wire includes a first voltage wire portion directly electrically connected to the driving chip;

where the first initialization voltage wire portion, the first initial data wire portion, the first voltage line portion, and the first voltage wire portion are sequentially in a direction toward the active area.

DETAILED DESCRIPTION

Technical solutions of the embodiments of the present disclosure will be clearly and completely described hereinafter with reference to the accompanying drawings of the embodiments of the present disclosure. Apparently, the described embodiments are a part rather than all of the embodiments of the present disclosure. Based on the described embodiments of the present disclosure, all other embodiments obtained by those skilled in the art without creative efforts fall within the protection scope of the present disclosure.

Transistors used in all the embodiments of the present disclosure may be triodes, thin film transistors or field effect transistors or other devices with the same characteristics. In the embodiments of the present disclosure, in order to distinguish two electrodes of a transistor other than a control electrode, one of the two electrodes is referred to as a first electrode, and the other of the two electrodes is referred to as a second electrode.

In actual operations, when the transistor is a triode, the control electrode may be a base electrode, the first electrode may be a collector electrode, and the second electrode may be an emitter electrode; or, the control electrode may be a base electrode, the first electrode may be an emitter electrode, and the second electrode may be a collector electrode.

In actual operations, when the transistor is a thin film transistor or a field effect transistor, the control electrode may be a gate electrode, the first electrode may be a source electrode, and the second electrode may be a drain electrode; or, the control electrode may be a gate electrode, the first electrode may be a drain electrode, and the second electrode may be a source electrode.

Figure 1:
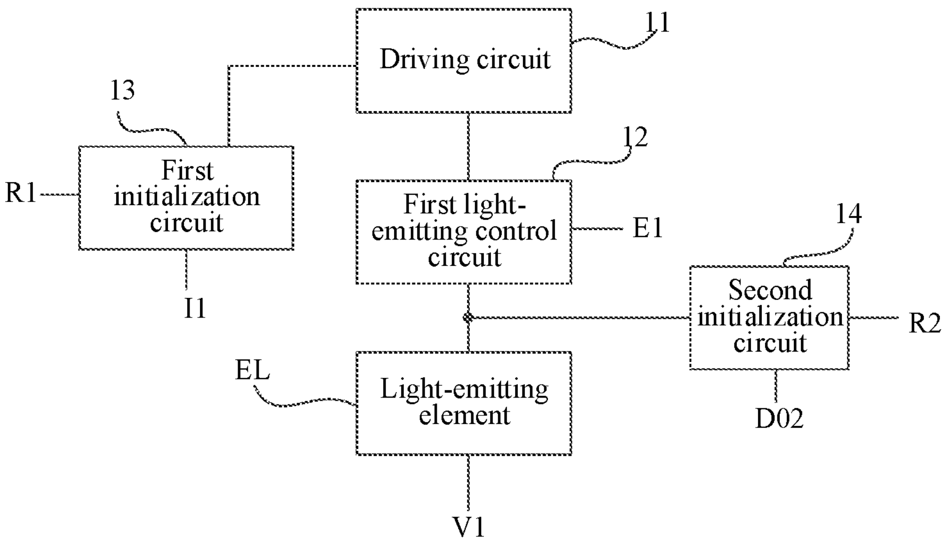
FIG. 1 is a structural diagram of a pixel circuit according to at least one embodiment of the present disclosure.

As shown in FIG. 1, a pixel circuit according to at least one embodiment of the present disclosure includes a driving circuit 11, a first light-emitting control circuit 12, a light-emitting element EL, a first initialization circuit 13, and a second initialization circuit 14.

The driving circuit 11 is configured to generate, under the control of a control terminal of the driving circuit, a driving current for driving the light-emitting element EL, and a cathode of the light-emitting element is electrically connected to a first voltage line V1.

The first light-emitting control circuit 12 is electrically connected to a light-emitting control line E1, the driving circuit 11, and an anode of the light-emitting element EL, and is configured to control, under the control of a light-emitting control signal provided by the light-emitting control line E1, the driving circuit 11 to be connected to or disconnected from the anode of the light-emitting element EL.

The first initialization circuit 13 is electrically connected to a first initialization control line R1, the control terminal of the driving circuit 11, and an initialization voltage line I1, and is configured to write, under the control of a first initialization control signal provided by the first initialization control line R1, an initialization voltage provided by the initialization voltage line I1, to the control terminal of the driving circuit 11.

The second initialization circuit 14 is electrically connected to a second initialization control line R2, the anode of the light-emitting element EL, and an initial data line D02, and is configured to write, under the control of a second initialization control signal R2 provided by the second initialization control line, an initial data voltage provided by the initial data line D02, to the anode of the light-emitting element EL.

In the pixel circuit described in at least one embodiment of the present disclosure, the initialization voltage is written to the control terminal of the driving circuit 11 via the first initialization circuit 13, to initialize the control terminal of the driving circuit 11, and the initial data voltage is written to the anode of the light-emitting element EL via the second initialization circuit 14, to initialize the anode of the light-emitting element EL. By adjusting the initial data voltage, light emission of the light-emitting element from a leakage current, and lateral leakage at low gray scales, which are caused when initializing the anode of the light-emitting element, can be prevented.

Optionally, the first initialization control line and the second initialization control line may be a same initialization control line; or, the first initialization control line and the second initialization control line may be different.

In at least one embodiment of the present disclosure, the pixel circuit is included in a display substrate, and the display substrate includes a base substrate, multiple rows of gate lines, multiple columns of display data lines, and multiple rows and multiple columns of pixel circuits, where the multiple rows of gate lines, the multiple columns of display data lines, and the multiple rows and multiple columns of pixel circuits are provided on the base substrate;

the n-th row of pixel circuits is electrically connected to the n-th row of first initialization control line and the n-th row of gate line; n is a positive integer; the n-th row of first initialization control line and the n-th row of second initialization control line are a same initialization control line;

the n-th row of first initialization control signal on the n-th row of first initialization control line is the same as the (n−1)-th row of gate driving signal on the (n−1)-th row of gate line;

n is a positive integer.

In at least one embodiment of the present disclosure, the pixel circuit is included in a display substrate, and the display substrate includes a base substrate, multiple rows of gate lines, multiple columns of display data lines, and multiple rows and multiple columns of pixel circuits, where the multiple rows of gate lines, the multiple columns of display data lines, and the multiple rows and multiple columns of pixel circuits are provided on the base substrate;

the n-th row of pixel circuits is electrically connected to the n-th row of first initialization control line, the n-th row of the second initialization control line, and the n-th row of gate line; n is a positive integer; the n-th row of first initialization control line and the n-th row of second initialization control line are different initialization control lines;

the n-th row of first initialization control signal on the n-th row of first initialization control line is the same as the (n−1)-th row of gate driving signal on the (n−1)-th row of gate line;

the n-th row of second initialization control signal on the n-th row of second initialization control line is the same as the n-th row of gate driving signal on the n-th row of gate line;

n is a positive integer.

In specific implementations, the rows of pixel circuits included in the display substrate may be sequentially arranged along an extension direction of the display data lines. For example, the rows of pixel circuits may be sequentially arranged in a direction toward a side of the display substrate where the driving chip is provided, and the present disclosure is not limited thereto.

Optionally, the first voltage line may be a ground line or a low-voltage signal line, and the present disclosure is not limited thereto.

In at least one embodiment of the present disclosure, the light-emitting element EL may be an OLED (Organic Light-Emitting Diode), and the present disclosure is not limited thereto.

Optionally, the second initialization circuit includes a first transistor;

a gate electrode of the first transistor is electrically connected to the second initialization control line, a first electrode of the first transistor is electrically connected to the initial data line, and a second electrode of the first transistor is electrically connected to the anode of the light-emitting element.

Optionally, the first initialization circuit includes a second transistor;

a gate electrode of the second transistor is electrically connected to the first initialization control line, a first electrode of the second transistor is electrically connected to the initialization voltage line, and a second electrode of the second transistor is electrically connected to the control terminal of the driving circuit.

Figure 2:
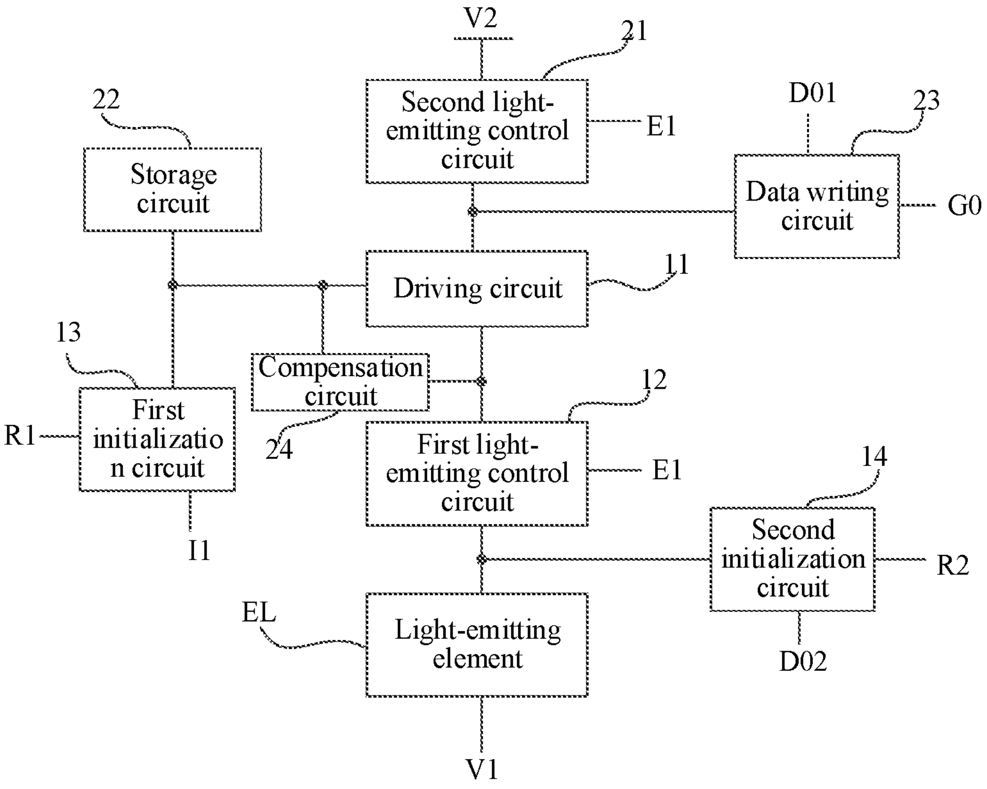
FIG. 2 is a structural diagram of a pixel circuit according to at least one embodiment of the present disclosure.

As shown in FIG. 2, based on at least one embodiment of the pixel circuit shown in FIG. 1, the pixel circuit further includes a second light-emitting control circuit 21, a storage circuit 22, a data writing circuit 23, and a compensation circuit 24, where the first light-emitting control circuit 12 is electrically connected to a second terminal of the driving circuit 11.

The second light-emitting control circuit 21 is electrically connected to the light-emitting control line E1, a second voltage line V2, and a first terminal of the driving circuit 11, and is configured to control, under the control of the light-emitting control signal, the first terminal of the driving circuit 11 to be connected to or disconnected from the second voltage line V2.

The storage circuit 22 is electrically connected to the control terminal of the driving circuit 11, and is configured to maintain a potential of the control terminal of the driving circuit 11.

The data writing circuit 23 is electrically connected to the gate line G0, a display data line D01, and the first terminal of the driving circuit 11, and is configured to write, under the control of a gate driving signal, a display data voltage on the display data line D01, to the first terminal of the driving circuit 11.

The compensation circuit 24 is electrically connected to the gate line G0, the control terminal of the driving circuit 11, and the second terminal of the driving circuit 11, and is configured to control, under the control of the gate driving signal, the control terminal of the driving circuit 11 to be connected to or disconnected from the second terminal of the driving circuit 11.

In at least one embodiment of the present disclosure, the second voltage line may be a high-voltage signal line, and the present disclosure is not limited thereto.

The pixel circuit described in at least one embodiment of the present disclosure may further include the second light-emitting control circuit 21, the storage circuit 22, the data writing circuit 23, and the compensation circuit 24. The second light-emitting control circuit 21 controls the first terminal of the driving circuit 11 to be connected to or disconnected from the second voltage line V2, the storage circuit 22 maintains the potential of the control terminal of the driving circuit 11, the data writing circuit 23 controls the writing of the display data voltage to the first terminal of the driving circuit 11, and the compensation circuit 24 controls the compensation of the threshold voltage of the driving transistor included in the driving circuit 11.

Optionally, the driving circuit includes a driving transistor, a gate electrode of the driving transistor is the control terminal of the driving circuit, a first electrode of the driving transistor is the first terminal of the driving circuit, and a second electrode of the driving transistor is the second terminal of the driving circuit;

the first light-emitting control circuit includes a third transistor; a gate electrode of the third transistor is electrically connected to the light-emitting control line, a first electrode of the third transistor is electrically connected to the second electrode of the driving transistor, and a second electrode of the third transistor is electrically connected to the anode of the light-emitting element;

the second light-emitting control circuit includes a fourth transistor, a gate electrode of the fourth transistor is electrically connected to the light-emitting control line, a first electrode of the fourth transistor is electrically connected to the second voltage line, and a second electrode of the fourth transistor is electrically connected to the first electrode of the driving transistor;

the storage circuit includes a storage capacitor, a first electrode plate of the storage capacitor is electrically connected to the gate electrode of the driving transistor, and a second electrode plate of the storage capacitor is electrically connected to the second voltage line;

the data writing circuit includes a fifth transistor, a gate electrode of the fifth transistor is electrically connected to the gate line, a first electrode of the fifth transistor is electrically connected to the display data line, and a second electrode of the fifth transistor is electrically connected to the first electrode of the driving transistor;

the compensation circuit includes a sixth transistor, a gate electrode of the sixth transistor is electrically connected to the gate line, a first electrode of the sixth transistor is electrically connected to the gate electrode of the driving transistor, and a second electrode of the sixth transistor is electrically connected to the second electrode of the driving transistor.

Figure 3:
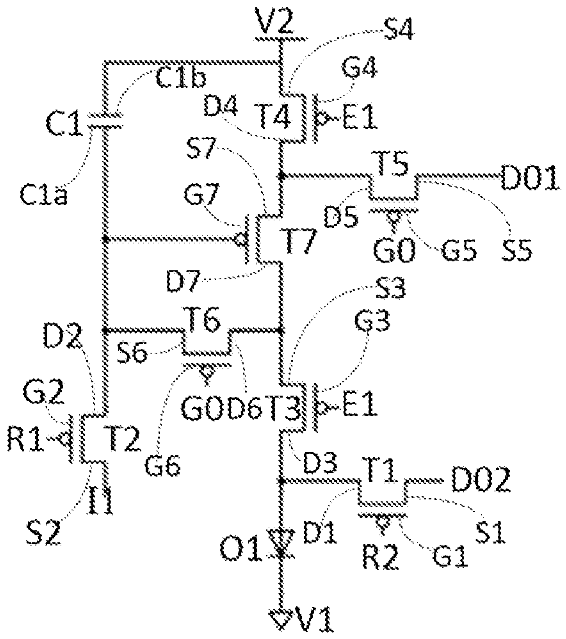
FIG. 3 is a circuit diagram of a pixel circuit according to at least one embodiment of the present disclosure.

As shown in FIG. 3, based on at least one embodiment of the pixel circuit shown in the figure, the light-emitting element is an organic light emitting diode O1; the driving circuit 11 includes a driving transistor T7.

The second initialization circuit includes a first transistor T1.

A gate electrode G1 of the first transistor T1 is electrically connected to the second initialization control line R2, a first electrode S1 of the first transistor T1 is electrically connected to the initial data line D02, and a second electrode D1 of the first transistor T1 is electrically connected to the anode of O1.

The first initialization circuit includes a second transistor T2.

A gate electrode G2 of the second transistor T2 is electrically connected to the first initialization control line R1, a first electrode S2 of the second transistor T2 is electrically connected to the initialization voltage line I1, and a second electrode D2 of the second transistor T2 is electrically connected to the control terminal of the driving circuit.

A gate electrode G7 of the driving transistor T7 is the control terminal of the driving circuit 11, a first electrode S7 of the driving transistor T7 is the first terminal of the driving circuit 11, and a second electrode D7 of the driving transistor T7 is the second terminal of the driving circuit 11.

The first light-emitting control circuit includes a third transistor T3.

A gate electrode G3 of the third transistor T3 is electrically connected to the light-emitting control line E1, a first electrode S3 of the third transistor T3 is electrically connected to the second electrode D7 of the driving transistor T7, and a second electrode D3 of the third transistor T3 is electrically connected to the anode of O1.

The second light-emitting control circuit includes a fourth transistor T4.

A gate electrode G4 of the fourth transistor T4 is electrically connected to the light-emitting control line E1, a first electrode S4 of the fourth transistor T4 is electrically connected to the second voltage line V2, and a second electrode D4 of the fourth transistor T4 is electrically connected to the first electrode S7 of the driving transistor T7.

The storage circuit includes a storage capacitor C1, a first electrode plate C1*a* of the storage capacitor C1 is electrically connected to the gate electrode G7 of the driving transistor T7, and a second electrode plate C1*b* of the storage capacitor C1 is electrically connected to the second voltage line V2.

The data writing circuit includes a fifth transistor T5, a gate electrode G5 of the fifth transistor T5 is electrically connected to the gate line G0, a first electrode of the fifth transistor is electrically connected to the display data line D01, and a second electrode of the fifth transistor is electrically connected to the first electrode of the driving transistor.

The compensation circuit includes a sixth transistor T6, a gate electrode G6 of the sixth transistor T6 is electrically connected to the gate line G0, a first electrode S6 of the sixth transistor T6 is electrically connected to the gate electrode G7 of the driving transistor T7, and a second electrode D6 of the sixth transistor T6 is electrically connected to the second electrode D7 of the driving transistor T7.

In at least one embodiment of the pixel circuit shown in FIG. 3, all the transistors are p-type thin film transistors, and the present disclosure is not limited thereto.

In at least one embodiment of the pixel circuit shown in FIG. 3, the second initialization control signal on R2 is the same as the gate driving signal on G0, and the present disclosure is not limited thereto.

When at least one embodiment of the pixel circuit shown in FIG. 3 of the present disclosure is in operation, a display period includes an initialization phase, a data writing phase, and a light-emitting phase that are sequentially arranged.

In the initialization phase, R1 provides a low-voltage signal, E1, G0, and R2 each provide a high-voltage signal, T2 is turned on, T1, T5, T3, T4, T6 are all turned off, and I1 provides the initialization voltage signal to the gate electrode of T7 to cause T7 to be turned off.

In the data writing phase, R1 provides a high-voltage signal, G0 and R2 each provide a low-voltage signal, E1 provides a high-voltage signal, T1, T5 and T6 are all turned on, T2, T3 and T4 are all turned off, and D02 provides the initial data voltage to the anode of O1 to cause O1 not to emit light; D01 provides the display data voltage Vd to S7, and the connection between G7 and D7 is turned on, to perform data voltage writing and compensation of the threshold voltage of T7.

In the light-emitting phase, R1, G0, and R2 each provide a high-voltage signal, E1 provides a low-voltage signal, T1, T2, T5, and T6 are all turned off, T3 and T4 are turned on, and T7 drives O1 to emit light.

A driving method described in at least one embodiment of the present disclosure is applied to the above-mentioned pixel circuit, and the driving method includes:

writing, by the first initialization circuit, under the control of the first initialization control signal, the initialization voltage provided by the initialization voltage line, to the control terminal of the driving circuit; and writing, by the second initialization circuit, under the control of the second initialization control signal, the initial data voltage provided by the initial data line, to the anode of the light-emitting element.

In the driving method described in at least one embodiment of the present disclosure, the initialization voltage is written to the control terminal of the driving circuit 11 via the first initialization circuit to initialize the control terminal of the driving circuit, and the initial data voltage is written to the anode of the light-emitting element via the second initialization circuit to initialize the anode of the light-emitting element. By adjusting the initial data voltage, light emission of the light-emitting element from a leakage current, and lateral leakage at low gray scales, which are caused when initializing the anode of the light-emitting element, can be prevented.

In specific implementations, the pixel circuit may further include a data writing circuit, and the pixel circuit is included in a display panel (the display panel may include the display substrate), and the driving method may further include:

writing, by the data writing circuit, a display data voltage on a display data line to the first terminal of the driving circuit, under the control of a gate driving signal;

a minimum display data voltage among all display data voltage connected to all pixel circuits in the display panel is greater than a predetermined gray-scale voltage, and the initial data voltage is the same as a first voltage provided by the first voltage line; or, a minimum display data voltage among all display data voltage connected to all pixel circuits in the display panel is less than a predetermined gray-scale voltage, the initial data voltage is different from a first voltage provided by the first voltage line, an absolute value of a difference between the initial data voltage and the first voltage is less than a predetermined voltage value, the difference between the initial data voltage and the first voltage is smaller than a turn-on voltage of the light-emitting element, and the predetermined voltage value is a positive value.

In at least one embodiment of the present disclosure, the predetermined gray-scale voltage and the predetermined voltage value may be selected according to actual conditions. For example, the predetermined gray-scale voltage may be a gray-scale voltage corresponding to L32, and the present disclosure is not limited thereto.

In at least one embodiment of the present disclosure, the initial data voltage is set according to the minimum display data voltage connected to the pixel circuits of the display panel.

When the minimum display data voltage is relatively large, the initial data voltage is set to be the same as the first voltage. In this way, when initializing the anode of the light-emitting element, it can be ensured that the light-emitting element does not emit light, which prevents light emission of the light-emitting element caused by leakage.

When the minimum display data voltage is relatively small, according to the actual situation, the initial data voltage is set to be slightly larger than the first voltage, or, the initial data voltage is set to be slightly smaller than the first voltage, to improve the situation of lateral leakage in the case of low gray scales, and the difference between the initial data voltage and the first voltage is less than the turn-on voltage of the light-emitting element, to ensure that the light-emitting element does not emit light when initializing the anode of the light-emitting element.

In the embodiments of the present disclosure, a display period may include an initialization phase, a data writing phase, and a light-emitting phase that are sequentially arranged.

When R1 and R2 are different initialization control lines, in the initialization phase, the first initialization circuit controls, under the control of the first initialization control signal, the initialization voltage provided by the initialization voltage line, to be written to the control terminal of the driving circuit; in the data writing phase, the second initialization circuit controls, under the control of the second initialization control signal, the initial data voltage provided by the initial data line, to be written to the anode of the light-emitting element, and the data writing circuit writes, under the control of the gate driving signal, the display data voltage on the display data line, to the first terminal of the driving circuit.

When R1 and R2 are the same initialization control line, in the initialization phase, the first initialization circuit controls, under the control of the first initialization control signal, the initialization voltage provided by the initialization voltage line, to be written to the control terminal of the driving circuit, the second initialization circuit controls, under the control of the second initialization control signal, the initial data voltage provided by the initial data line, to be written to the anode of the light-emitting element; in the data writing stage, the data writing circuit writes, under the control of the gate driving signal, the display data voltage on the display data line, to the first terminal of the driving circuit.

A display substrate according to at least one embodiment of the present disclosure includes a base substrate and the above-mentioned pixel circuit provided on the base substrate.

Optionally, the pixel circuit includes a driving transistor and a storage capacitor, and the display substrate further includes an initial data line arranged on the base substrate.

A gate electrode of the driving transistor is also used as a first electrode plate of the storage capacitor.

The initial data line and the gate electrode of the driving transistor are arranged in a same layer and are made of a same material, or, the initial data line and a second electrode plate of the storage capacitor are arranged in a same layer and are made of a same material.

In at least one embodiment of the present disclosure, the display substrate may include an active layer, a first gate metal layer, a second gate metal layer, and a first source and drain metal layer that are sequentially disposed on the base substrate.

A patterning process may be performed on the first gate metal layer to form the gate lines and the gate electrode of each transistor, and a patterning process may be performed on the second gate metal layer to form the second electrode plate of the storage capacitor; the initial data line and the gate electrode of each transistor may be arranged in a same layer and made of a same material, or, the initial data line and the second electrode plate of the storage capacitor may be arranged in a same layer and made of a same material. That is, the initial data line may be formed in the first gate metal layer or the second gate metal layer.

In specific implementations, when the initial data line is formed in the first gate metal layer or the second gate metal layer, the display substrate further includes a gate line disposed on the base substrate.

An extension direction of the initial data line is the same as an extension direction of the gate line.

In at least one embodiment of the present disclosure, the extension direction of the initial data line being the same as the extension direction of the gate line may refer to that: the extension direction of the initial data line is exactly the same as the extension direction of the gate line, or, an angle between the extension direction of the initial data line and the extension direction of the gate line is less than a predetermined angle to cause the extension direction of the initial data line to be substantially the same as the extension direction of the gate line; and the present disclosure is not limited thereto.

Optionally, the display substrate further includes a display data line arranged on the base substrate.

The initial data line and the display data line are arranged in a same layer and made of a same material, or, the initial data line is arranged on a side of the display data line facing away from the base substrate.

In at least one embodiment of the present disclosure, the display substrate may include an active layer, a first gate metal layer, a second gate metal layer, and a first source and drain metal layer that are sequentially disposed on the base substrate. A patterning process may be performed on the first source and drain metal layer to form the display data line and the initial data line, and the initial data line and the display data line may be arranged in a same layer and made of a same material, that is, the initial data line is formed in the first source and drain metal layer; or, the display substrate may include an active layer, a first gate metal layer, a second gate metal layer, a first source and drain metal layer, and a second source and drain metal layer that are sequentially disposed on the base substrate. A patterning process may be performed on the first source and drain metal layer to form the display data line, and a patterning process may be performed on the second source and drain metal layer to form the initial data line, that is, the initial data line is disposed on a side of the display data line facing away from the base substrate, and the initial data line is formed in the second source and drain metal layer.

In specific implementations, when the initial data line is formed in the first source and drain metal layer or the second source and drain metal layer, an extension direction of the initial data line may be the same as an extension direction of the display data line.

In at least one embodiment of the present disclosure, the extension direction of the initial data line being the same as the extension direction of the display data line may refer to that: the extension direction of the initial data line is completely the same as the extension direction of the display data line, or, an angle between the extension direction of the initial data line and the extension direction of the display data line is less than a predetermined angle to cause the extension direction of the initial data line to be substantially the same as the extension direction of the display data line; and the present disclosure is not limited thereto.

Optionally, the pixel circuit includes a first transistor, and the display substrate further includes the second initialization control line and the initial data line provided on the base substrate;

a gate electrode of the first transistor and a gate electrode of the driving transistor are in a same layer and made of a same material, and the gate electrode of the first transistor is electrically connected to the second initialization control line;

a first electrode of the first transistor, a second electrode of the first transistor, a first electrode of the driving transistor, and a second electrode of the driving transistor are arranged in a same layer and made of a same material;

the first electrode of the first transistor is electrically connected to the initial data line, and the second electrode of the first transistor is electrically connected to the anode of the light-emitting element.

In at least one embodiment of the present disclosure, the second initialization control line and the gate line may be arranged in a same layer and made of a same material, and the second initialization control signal on the second initialization control line may be the same as the gate driving signal on the gate line.

Optionally, the pixel circuit may include a driving transistor and a storage capacitor;

a gate electrode of the driving transistor is also used as a first electrode plate of the storage capacitor;

the initialization voltage line and the gate electrode of the driving transistor are arranged in a same layer and made of a same material, or, the initialization voltage line and a second electrode plate of the storage capacitor are arranged in a same layer and made of a same material.

In specific implementations, the initialization voltage line may be formed in the first gate metal layer, or, the initialization voltage line may be formed in the second gate metal layer, and the present disclosure is not limited thereto.

Optionally, the display substrate may further include a gate line arranged on the base substrate;

an extension direction of the initialization voltage line is the same as an extension direction of the gate line.

In at least one embodiment of the present disclosure, the extension direction of the initialization voltage line being the same as the extension direction of the gate line may refer to that: the extension direction of the initialization voltage line is exactly the same as the extension direction of the gate line, or, an angle between the extension direction of the initialization voltage line and the extension direction of the gate line is less than a predetermined angle to cause the extension direction of the initialization voltage line to be substantially the same as the extension direction of the gate line; and the present disclosure is not limited thereto.

Figure 4:
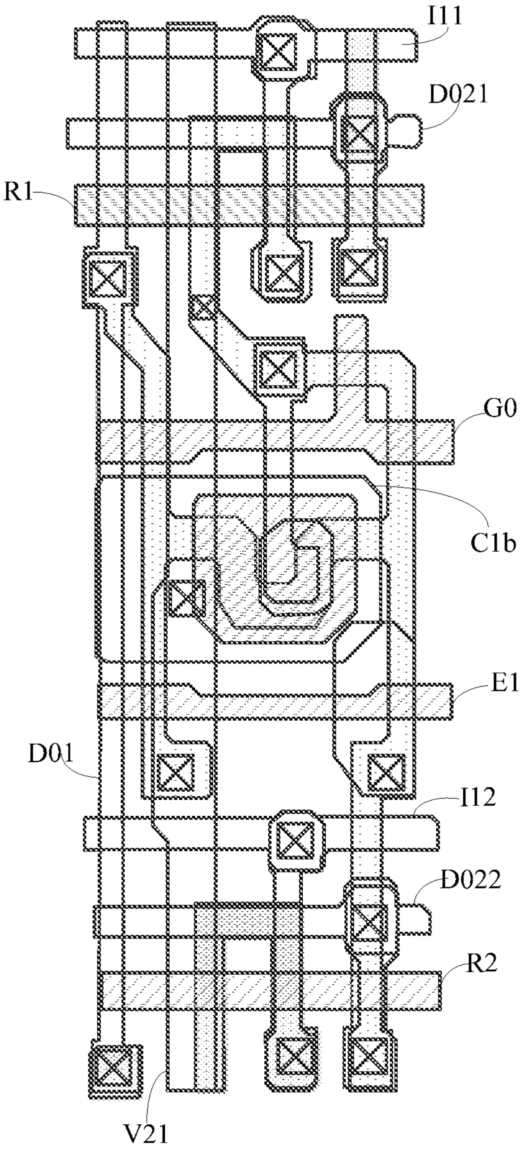
FIG. 4 is a schematic diagram of layout of a pixel circuit according to at least one embodiment of the present disclosure.

FIG. 4 is a schematic diagram of the layout of the pixel circuit according to at least one embodiment of the present disclosure. The pixel circuit is arranged in the active area of the display substrate.

In FIG. 4, I11 is a first initialization voltage line portion included in the initialization voltage line, D021 is a first initial data line portion included in the initial data line, I12 is a second initialization voltage line portion included in the initialization voltage line, and D022 is a second initial data line portion included in the initial data line; I11, I12, D021 and D022 may be set in the active area; each of I11 and I12 may be electrically connected to the initialization voltage wire outside the active area, I11 and I12 are electrically connected to each other, each of D021 and D022 may be electrically connected to the initial data wire outside the active area, and D021 and D022 are electrically connected to each other; and the present disclosure is not limited thereto.

In at least one embodiment of the present disclosure, the display substrate includes multiple rows and multiple columns of pixel circuits disposed on the base substrate, each row of pixel circuits is electrically connected to the same row of gate line, and the same column of pixel circuits are electrically connected to the same column of display data line. When the pixel circuit adopts the structure shown in FIG. 4, the initialization voltage line includes multiple initialization voltage line portions extending in the first direction, each row of pixel circuits is electrically connected to the corresponding initialization voltage line portion, the initial data line includes multiple initial data line portions extending in the first direction, and each row of pixel circuits is electrically connected to the corresponding initial data line portion.

The same row of pixel circuits may be electrically connected to the same initialization voltage line portion, and the same row of pixel circuits may be electrically connected to the same initial data line portion.

In addition, the initial data wire and the initialization voltage wire are provided outside the active area of the display substrate, the initialization voltage wire is used to provide the initialization voltage to each of the initialization voltage line portions, the initial data line is used to provide the initial data voltage to each of the initial data line portions, the initialization voltage line portions are electrically connected to each other, and the initial data line portions are electrically connected to each other.

In FIG. 4, R1 is the first initialization control line, G0 is the gate line, C1*b* is the second electrode plate of the storage capacitor in the pixel circuit, E1 is the light-emitting control line, D01 is the display data line, and R2 is the second initialization control line.

The second initialization control signal provided to the second initialization control line R2 is the same as the gate driving signal provided to G0.

In at least one embodiment corresponding to FIG. 4, on the base substrate, an active layer, a first gate metal layer, a second gate metal layer, and a first source and drain metal layer are sequentially arranged along a direction leaving the base substrate.

A patterning process is performed on the first gate metal layer to form the gate line G0, the first initialization control line R1, the second initialization control line R2, the light-emitting control line E1, and the gate electrode of each transistor in the pixel circuits.

A patterning process is performed on the second gate metal layer to form the initial data line, the initialization voltage line, and the second electrode plate of the storage capacitor in the pixel circuit.

In at least one embodiment shown in FIG. 4, the initial data line and the initialization voltage line are formed in the second gate metal layer, the extension direction of the initial data line is the same as the extension direction of the gate line G0, and the extension direction of the initialization voltage line is the same as the extension direction of the gate line G0.

In at least one embodiment shown in FIG. 4, the extension direction of G0 may be a first direction, the first direction may be, for example, a horizontal direction, the extension direction of D01 may be a second direction, and the second direction may be, for example, a vertical direction; and the present disclosure is not limited thereto.

In at least one embodiment of the present disclosure, the extension direction of the gate line may be the first direction, the extension direction of the display data line may be the second direction, and the first direction and the second direction intersect; and the present disclosure is not limited thereto.

Figure 5:
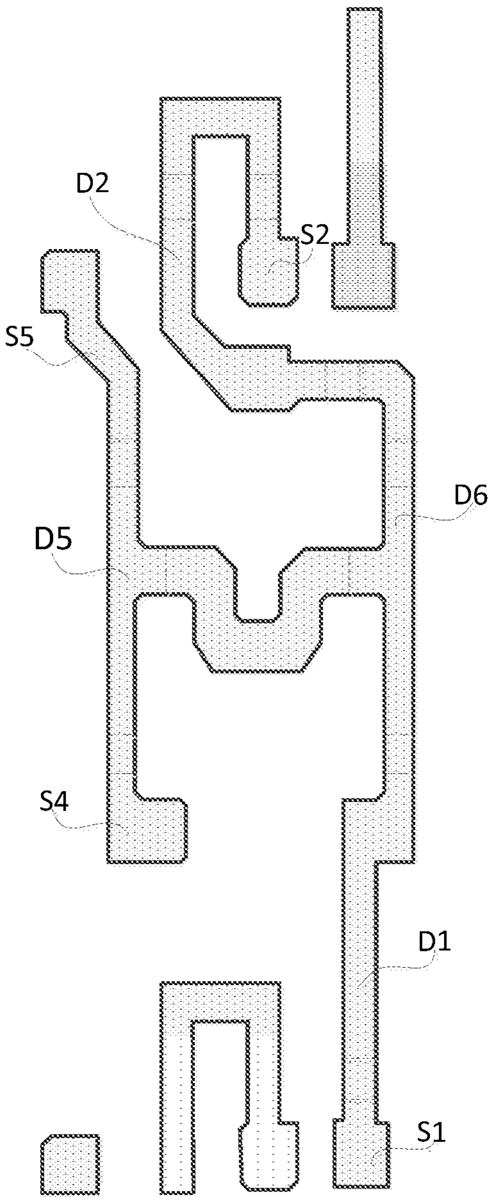
FIG. 5 is a structural diagram of an active layer in FIG. 4.

As shown in FIG. 5, the pattern of the active layer in FIG. 4 includes the first electrode S1 of the first transistor, the second electrode D1 of the first transistor, the first electrode S2 of the second transistor, the second electrode D2 of the second transistor, the first electrode S4 of the fourth transistor, the first electrode S5 of the fifth transistor, the second electrode D5 of the fifth transistor, and the second electrode D6 of the sixth transistor.

In at least one embodiment corresponding to FIGS. 4 and 5, the second electrode D2 of the second transistor is also used as the first electrode of the sixth transistor, the second electrode D5 of the fifth transistor is also used as the second electrode of the fourth transistor, the second electrode D5 of the fifth transistor is also used as the first electrode of the driving transistor, and the second electrode D6 of the sixth transistor is also used as the second electrode of the driving transistor.

Figure 6:
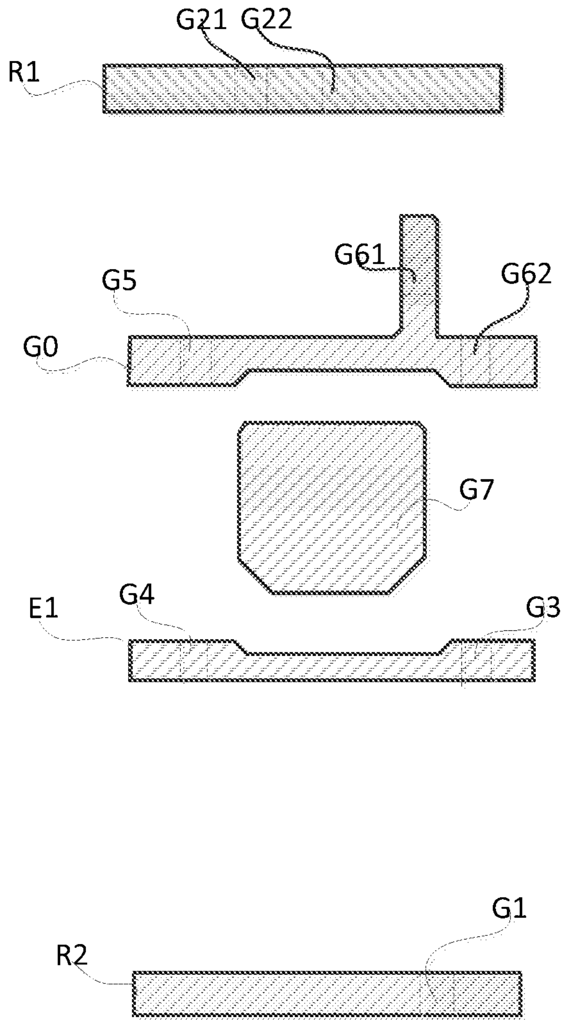
FIG. 6 is a structural diagram of a first gate metal layer in FIG. 4.

As shown in FIG. 6, T2 is a dual gate transistor, G21 is the first gate electrode pattern included in the gate electrode of the second transistor, and G22 is the second gate electrode pattern included in the gate electrode of the second transistor;

G5 is the gate electrode of the fifth transistor;

T6 is a dual gate transistor, G61 is the third gate electrode pattern included in the gate electrode of the sixth transistor, and G62 is the fourth gate electrode pattern included in the gate electrode of the sixth transistor;

G3 is the gate electrode of the third transistor, G4 is the gate electrode of the fourth transistor, and G1 is the gate electrode of the first transistor;

G7 is the gate electrode of the driving transistor, and G7 is also used as the first electrode plate of the storage capacitor in the pixel circuit.

Figure 7:
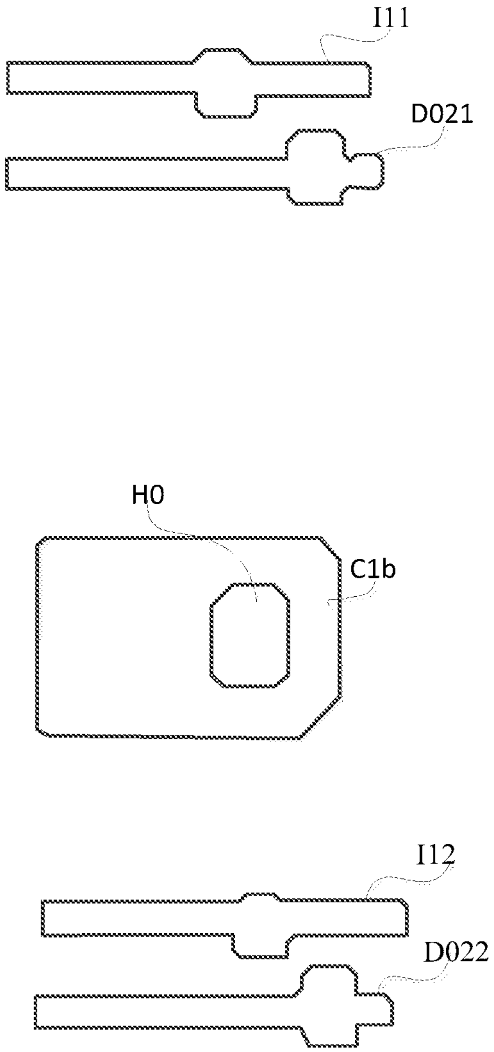
FIG. 7 is a structural diagram of a second gate metal layer in FIG. 4.

As shown in FIG. 7, C1*b* is the second electrode plate of the storage capacitor, H0 is the connecting hole provided in C1*b*, and D2 is electrically connected to G2 through the connecting hole H0.

Figure 8:
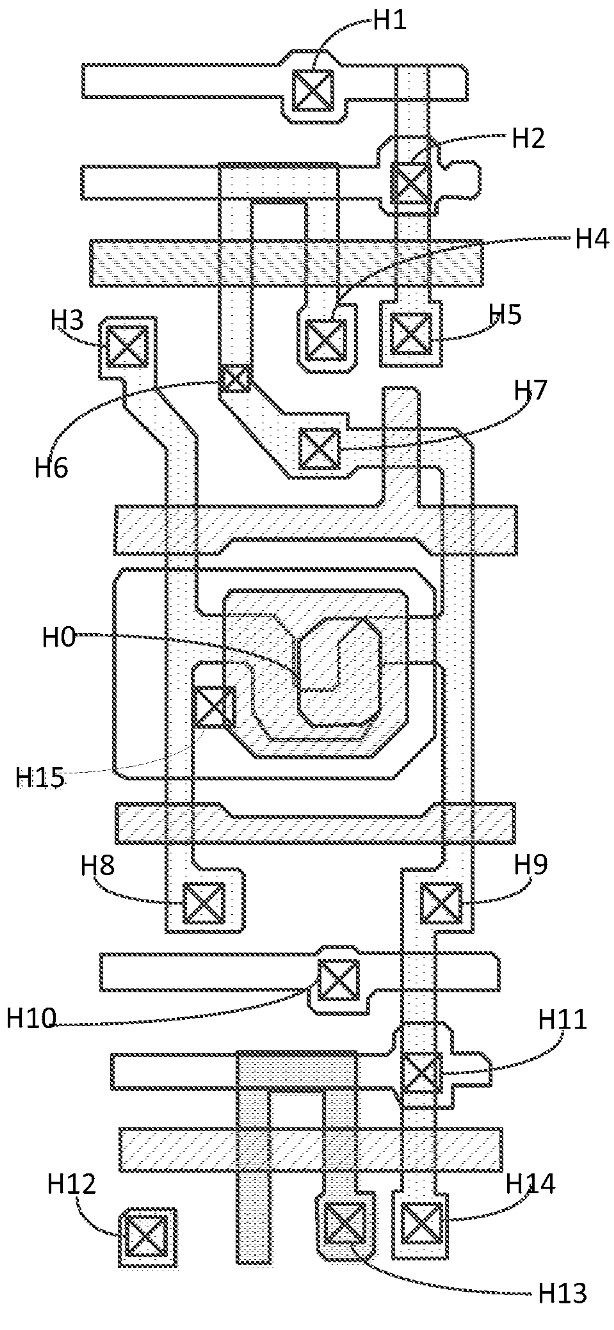
FIG. 8 is a schematic diagram of a via hole in FIG. 4.

After the active layer, the first gate metal layer and the second gate metal layer are arranged in sequence, an interlayer dielectric layer may be provided, and after the interlayer dielectric layer is provided, via holes may be formed. As shown in FIG. 8, H1 is the first via hole, H2 is the second via hole, H3 is the third via hole, H4 is the fourth via hole, H5 is the fifth via hole, H6 is the sixth via hole, H7 is the seventh via hole, H8 is the eighth via hole, H9 is the ninth via hole, H10 is the tenth via hole, H11 is the eleventh via hole, H12 is the twelfth via hole, H13 is the thirteenth via hole, H14 is the fourteenth via hole, and H15 is the fifteenth via hole.

Figure 9:
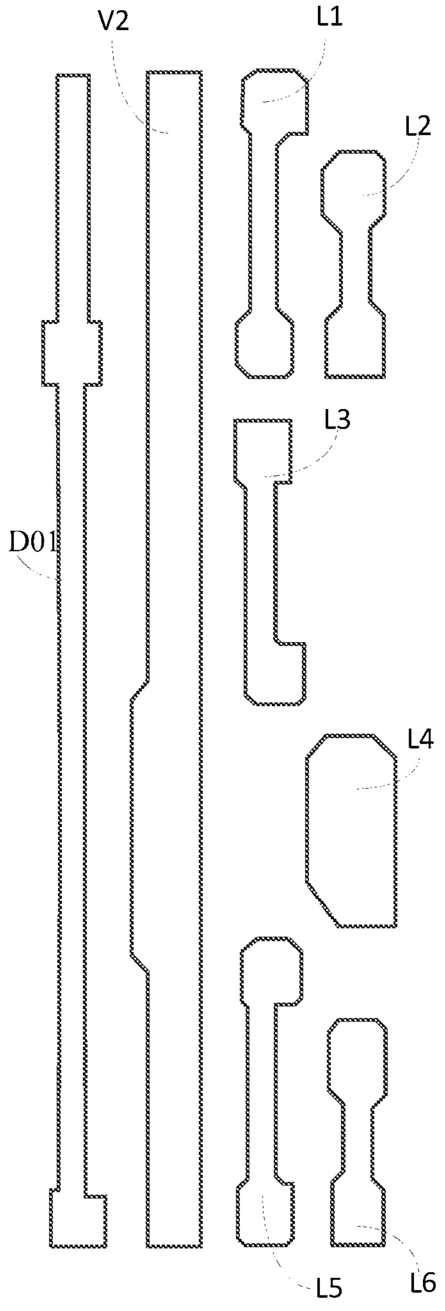
FIG. 9 is a schematic diagram of a structure of a first source and drain metal layer in FIG. 4.

As shown in FIG. 9, the pattern of the first source and drain metal layer includes the display data line D01, the second voltage line, the first conductive connection portion L1, the second conductive connection portion L2, the third conductive connection portion L3, the fourth conductive connection portion L3, the conductive connection portion L4, the fifth conductive connection portion L5, and the sixth conductive connection portion L6. In FIG. 8, V21 is the first voltage line portion included in the second voltage line.

When the pixel circuit adopts the structure shown in FIG. 4, the second voltage line includes multiple voltage line portions extending in the second direction, and each column of pixel circuits is electrically connected to the corresponding voltage line portion; a second voltage wire is provided outside the active area, the second voltage wire is used to provide the second voltage signal to each of the voltage line portions included in the second voltage line, and the voltage line portions included in the second voltage line are electrically connected to each other.

As shown in FIGS. 4 to 9, S2 is electrically connected to the first conductive connection portion L1 through the fourth via hole H4, and L1 is electrically connected to I11 through the first via hole H1, so that S2 and I11 are electrically connected, that is, S2 is electrically connected to the initialization voltage line;

S1 is electrically connected to L6 through H14, and L6 is electrically connected to D022 through H11, so that S1 is electrically connected to D022, that is, S1 is electrically connected to the initial data line;

D2 is electrically connected to L3 through H7, and L3 is electrically connected to G7 through H0;

S5 is electrically connected to D01 through H3;

S4 is electrically connected to V21 through H8;

D1 is electrically connected to L4 through H9, and L4 is electrically connected to the anode layer through a via hole.

When manufacturing the display substrate, after fabricating the first source and drain metal layer, the first planarization layer and the anode layer are manufactured in sequence. The anode layer includes multiple mutually independent anodes. L4 may be electrically connected to the anode through a via hole penetrating through the first planarization layer. After the anode layer is fabricated, a PDL layer (pixel definition layer), an organic light-emitting function layer, and a cathode layer may be fabricated in sequence.

In at least one embodiment of the present disclosure, the cathode layer may cover the entire active area, and the cathode layer may bond, in the non-display area of the display substrate, with the first voltage line through the anode layer, so that the cathode of the light-emitting element is electrically connected to the first voltage line; and the present disclosure is not limited thereto. Optionally, the first voltage line may be arranged around the active area, and the present disclosure is not limited thereto.

In at least one embodiment of the present disclosure, a first gate insulating layer may be provided between the active layer and the first gate metal layer, a second gate insulating layer may be provided between the first gate metal layer and the second gate metal layer, and an interlayer dielectric layer may be provided between the second gate metal layer and the first source and drain metal layer; and the present disclosure is not limited thereto.

In at least one embodiment shown in FIG. 4, both the initial data line and the initialization voltage line are formed in the second gate metal layer, and the present disclosure is not limited thereto.

When the display substrate includes at least one embodiment of the pixel circuit as shown in FIG. 4, both the initial data line and the initialization voltage line extend in the first direction. For example, the first direction may be a horizontal direction. Then the multiple rows of initial data line portions included in the initial data line also extend in the first direction, and the multiple rows of initialization voltage line portions included in the initialization voltage line also extend in the first direction. Outside the active area of the display substrate, the initial data wire providing the initial data voltage and the initialization voltage wire providing the initialization voltage may be provided, and the initial data wire and the initialization voltage wire may be arranged at the first side and/or the second side (the first side may be the left side, and the second side may be the right side) of the display substrate. At least part of wires included in the initial data wire and at least part of wires included in the initialization voltage wire may extend in the second direction (the second direction may be, for example, the vertical direction), each row of initial data line portion may extend in the first direction until it is electrically connected to the initial data wire, and each row of initialization voltage line portion may extend in the first direction until it is electrically connected to the initialization voltage wire.

In at least one embodiment shown in FIG. 4, the second voltage line extends in the second direction, and the multiple voltage line portions included in the second voltage line extend in the second direction, so the second voltage wire used for providing the second voltage signal may be arranged at a side of the active area of the display substrate that is close to the driving chip. For example, the second voltage wire may be arranged at the lower side of the display substrate; and the present disclosure is not limited thereto.

Optionally, the second voltage wire may include a second voltage wire portion extending in the first direction and a first voltage wire portion extending in the second direction. The second voltage wire portion is used for electrically connecting the multiple voltage line portions included in the second voltage line (for example, when the second voltage wire is disposed at the lower side of the display substrate, each voltage line portion included in the second voltage line may extend downward, in the second direction, so as to be electrically connected to the second voltage wire portion), the first terminal of the first voltage wire portion is electrically connected to the second voltage wire portion, and the second terminal of the first voltage wire portion is directly electrically connected to the driving chip to receive the second voltage signal provided by the driving chip.

In at least one embodiment shown in FIGS. 4, R1 and R2 are different initialization control lines. In actual operations, R1 and R2 may be the same initialization control line.

Figure 10:
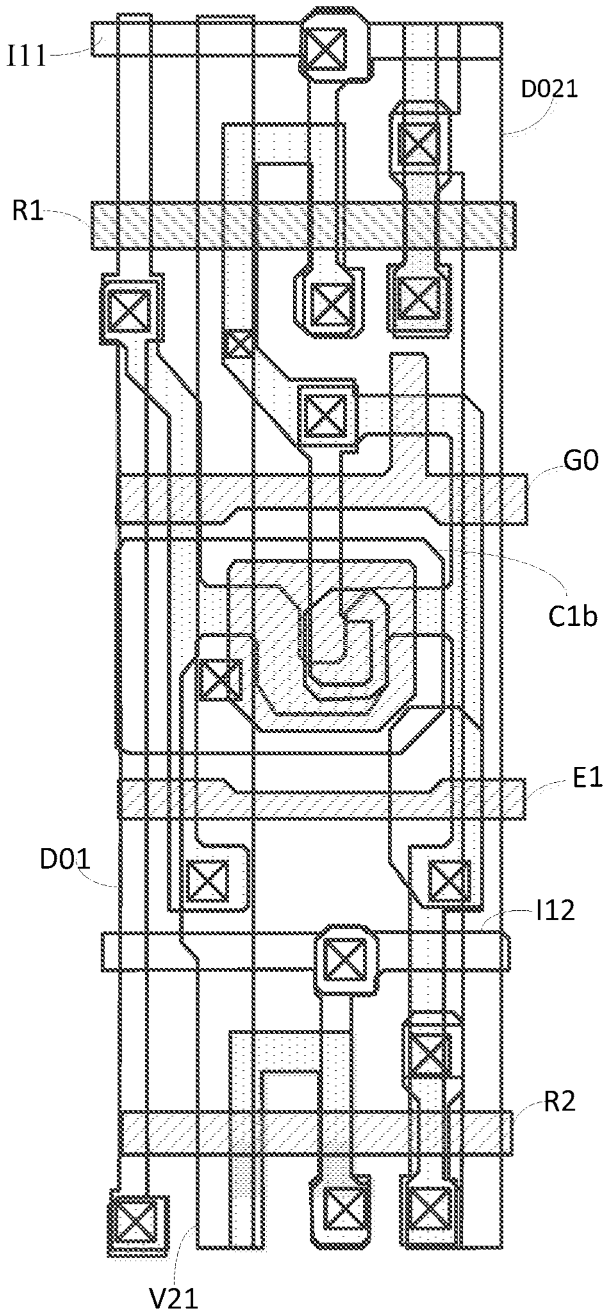
FIG. 10 is a schematic diagram of layout of a pixel circuit according to at least one embodiment of the present disclosure.

The difference between at least one embodiment of the pixel circuit shown in FIG. 10 and at least one embodiment of the pixel circuit shown in FIG. 4 is that: a second source and drain metal layer is further provided on a side of the first source and drain metal layer away from the base substrate, and the initial data line extends in the second direction, that is, the extension direction of the initial data line is the same as the extension direction of the display data line, and a patterning process is performed on the second source and drain metal layer to form each initial data line portion included in the initial data line. In FIG. 10, D021 is the first initial data line portion included in the initial data line.

Figure 11:
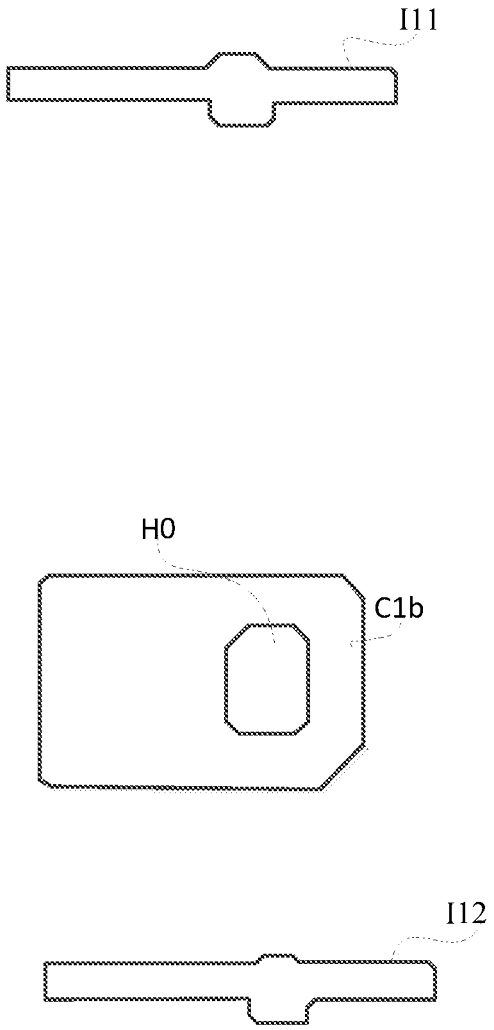
FIG. 11 is a structural diagram of a second gate metal layer in FIG. 10.
Figure 12:
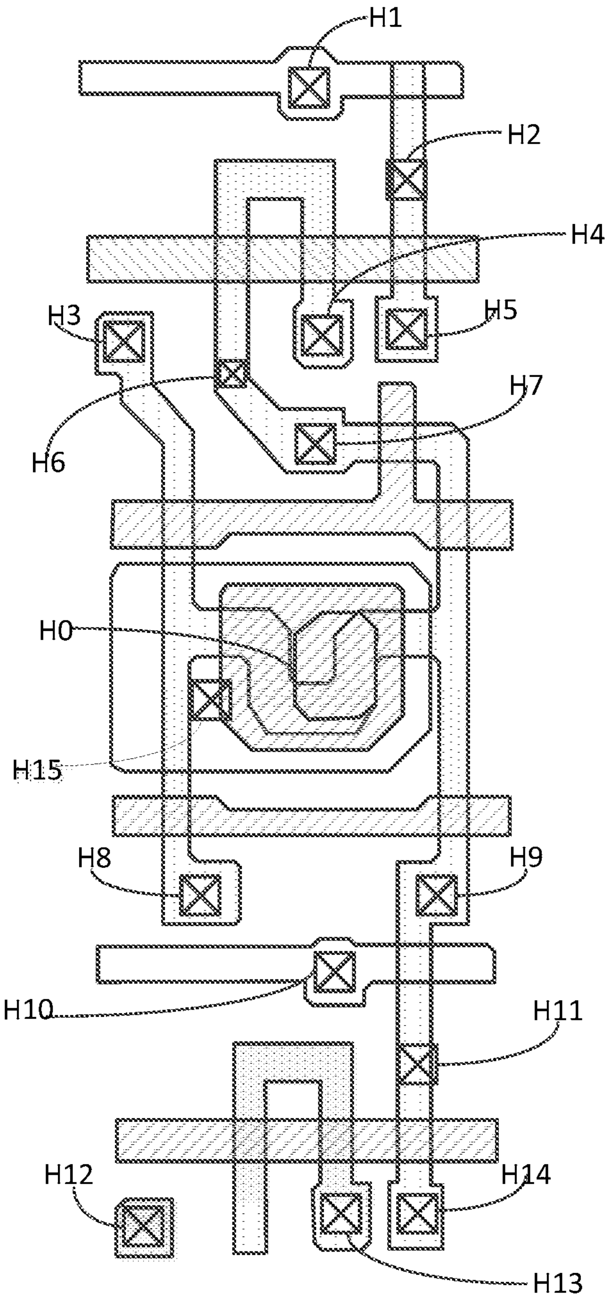
FIG. 12 is a schematic diagram of an via hole in FIG. 10.
Figure 13:
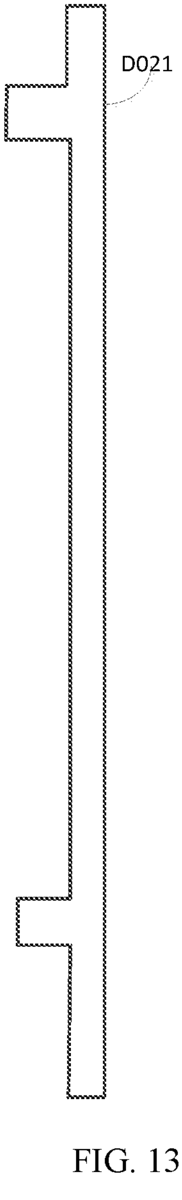
FIG. 13 is a structural diagram of a second source and drain metal layer in FIG. 10.

The structure diagram of the active layer in FIG. 10 is shown in FIG. 5, the structure diagram of the first gate metal layer in FIG. 10 is shown in FIG. 6, and the structure diagram of the second gate metal layer in FIG. 10 is shown in FIG. 11, the schematic diagram of the via holes in FIG. 10 is shown in FIG. 12, the structure diagram of the first source and drain metal layer in FIG. 10 is shown in FIG. 9, and the structure diagram of the second source and drain metal layer in FIG. 10 is shown in FIG. 13.

As shown in FIG. 9 and FIGS. 10-13, L6 is electrically connected to D021 through H11. As shown in FIG. 10, the extension direction of D021 is the same as the extension direction of D01.

The connection relationship of other components in FIG. 10 is the same as the connection relationship of components in FIG. 4.

When the display substrate includes multiple rows and multiple columns of pixel circuits according to at least one embodiment shown in FIG. 10, the same column of the pixel circuits may be electrically connected to the same initial data line portion, and the same row of the pixel circuits may be electrically connected to the same initialization voltage line portion.

In at least one embodiment shown in FIGS. 10, R1 and R2 are different initialization control lines. In actual operations, R1 and R2 may be the same initialization control line.

A display device according to the embodiments of the present disclosure includes the above-mentioned display substrate.

In specific implementations, the display device described in at least one embodiment of the present disclosure may further include a driving chip and an initial data wire, a first voltage line and a second voltage wire, where the initial data wire, the first voltage line and the second voltage wire are outside an active area of the base substrate;

the initial data wire includes a first initial data wire portion directly electrically connected to the driving chip;

the first voltage line includes a first voltage line portion directly electrically connected to the driving chip, and the second voltage wire includes a first voltage wire portion directly electrically connected to the driving chip;

the first initial data wire portion is between the first voltage line portion and the first voltage wire portion.

In at least one embodiment of the present disclosure, the first initial data wire portion is disposed between the first voltage line portion and the first voltage wire portion, the first voltage line portion is used to provide the first voltage signal, the first voltage wire portion is used to provide the second voltage signal, and the first voltage signal and the second voltage signal are both direct-current voltage signals, so that interference may not be caused for the initial data voltage on the first initial data wire portion.

Optionally, the driving chip may be arranged on a COF (chip on film) or directly bound to the base substrate, and the COF may be attached to a side of the display substrate; and the present disclosure is not limited thereto. The driving chip may be used to provide the first voltage signal, the second voltage signal, the initialization voltage, and the initial data voltage.

In at least one embodiment of the present disclosure, the base substrate may be a flexible substrate or a rigid substrate, and the driving chip may use COP (Chip On Pi, COP is a technology in which the chip is bound on a flexible substrate) technology or COG (Chip On Glass, COG is a technology in which the chip is directly bound on the glass surface) technology so as to be bound on the base substrate.

Optionally, the first initial data wire portion, the first voltage line portion, and the first voltage wire portion all extend in the second direction, and the present disclosure is not limited thereto.

The second direction is a direction in which the display data line extends.

In at least one embodiment of the present disclosure, the display device may further include a driving chip, an initial data wire, an initialization voltage wire, a first voltage line, and a second voltage wire, where the initial data wire, the initialization voltage wire, the first voltage line, and the second voltage wire are outside an active area of the base substrate;

the initial data wire includes a first initial data wire portion directly electrically connected to the driving chip;

the initialization voltage wire includes a first initialization voltage wire portion directly electrically connected to the driving chip;

the first voltage line includes a first voltage line portion directly electrically connected to the driving chip, and the second voltage wire includes a first voltage wire portion directly electrically connected to the driving chip;

the first initialization voltage wire portion, the first initial data wire portion, the first voltage line portion, and the first voltage wire portion are sequentially in a direction toward the active area.

In specific implementations, if the space is limited, the first initial data wire portion may be arranged between the first initialization voltage wire portion and the first voltage line portion.

Figure 14:
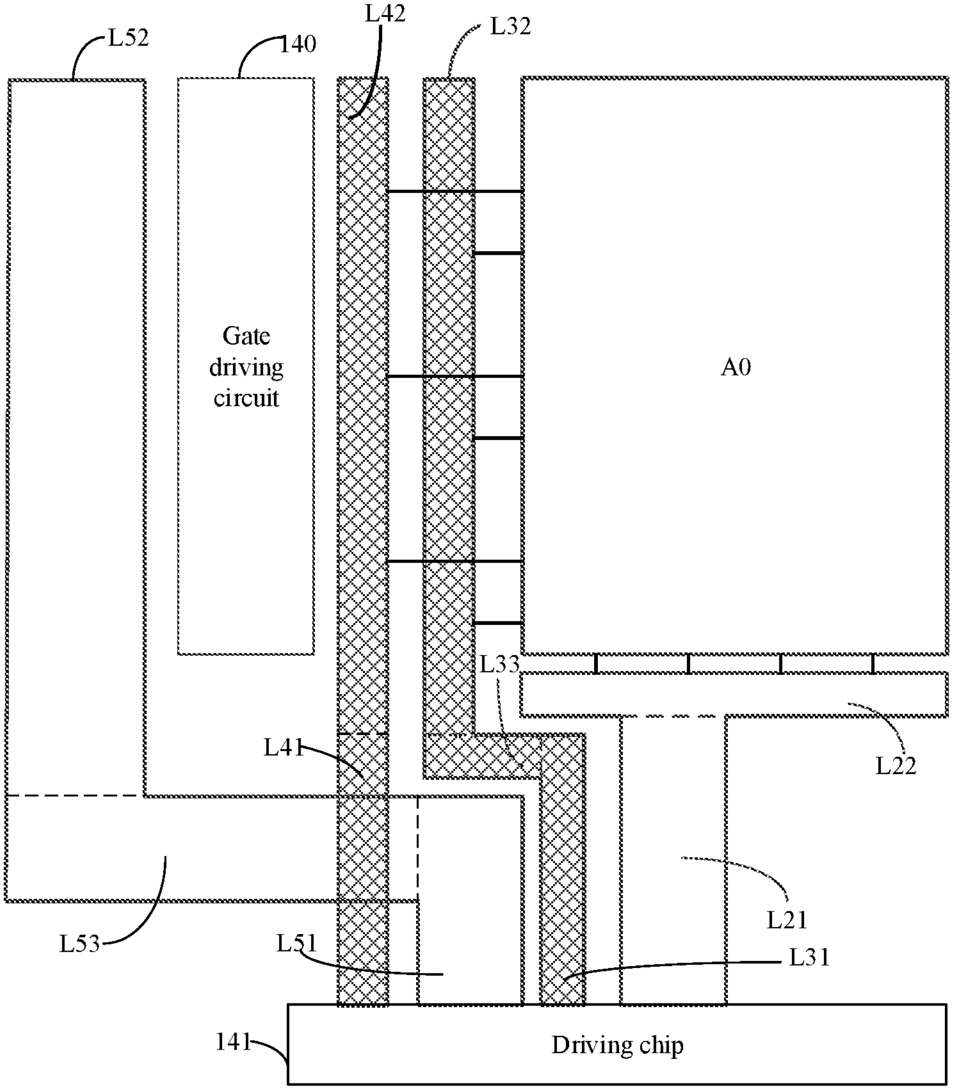
FIG. 14 is a structural diagram of a display device according to at least one embodiment of the present disclosure.

As shown in FIG. 14, when the extension direction of the initialization voltage line and the extension direction of the initial data line are both the same as the extension direction of the gate line (the extension direction of the gate line is the first direction), the display substrate according to at least one embodiment of the present disclosure further includes the initial data wire, the initialization voltage wire, the gate driving circuit 140, the first voltage line, and the second voltage wire that are arranged outside the active area A0.

The second voltage wire includes the second voltage wire portion L22 extending in the first direction and the first voltage wire portion L21 extending in the second direction. The second voltage wire portion L22 is used to electrically connect the multiple voltage line portions included in the second voltage line (when the second voltage wire is disposed at the lower side of the display substrate, each voltage line portion included in the second voltage line may extend downward, in the second direction, so as to be electrically connected to the second voltage wire portion). The first terminal of the first voltage wire portion L21 is electrically connected to the second voltage wire portion L22, and the second terminal of the first voltage wire portion L21 is directly electrically connected to the driving chip 141 to receive the second voltage signal provided by the driving chip 141.

The initial data wire includes the first initial data wire portion L31 extending in the second direction, the second initial data wire portion L32 disposed on the left side of the active area A0, and the third initial data wire portion L33 used for electrically connecting L31 and L32; L32 may extend in the second direction; each initial data line portion included in the initial data line is directly electrically connected to the second initial data wire portion L32; L31, L32 and L33 are an integrated structure; L31 is directly electrically connected to the driving chip 141 to receive the second voltage signal provided by the driving chip 141.

The initialization voltage wire includes the first initialization voltage wire portion L41 extending in the second direction, and the second initialization voltage wire portion L42 arranged on the left side of the active area A0, where L41 is directly electrically connected to L42; L41 and L42 are an integrated structure; L41 is directly electrically connected to the driving chip 141, and the driving chip 141 is used to provide the initialization voltage to L41; L42 also extends in the second direction.

The gate driving circuit 140 is arranged on a side of L42 away from the active area A0; the gate driving circuit 140 may be electrically connected to multiple rows of gate lines.

The first voltage line includes the first voltage line portion L51 directly electrically connected to the driving chip 141, the second voltage line portion L52 provided on the left side of the active area A0, and the third initial data wire portion L53 used for electrically connecting L51 and L52; L51 and L52 extend in the second direction, and L53 extends in the first direction; the driving chip 141 provides the first voltage signal to L51.

In actual operations, the first voltage line may be arranged on each of sides of the display substrate where the driving chip is not provided, and the first voltage line is electrically connected to the driving chip for receiving the first voltage signal provided by the driving chip; and the present disclosure is not limited thereto.

In addition, the initial data wire, the initialization voltage wire, and the second voltage wire may also be provided on the right side of the active area, and the present disclosure is not limited thereto.

In at least one embodiment of the present disclosure, the initialization voltage wire and the initialization voltage line may be arranged in a same layer and made of a same material, the initial data wire and the initial data line may be arranged in a same layer and made of a same material, and the second voltage wire and the second voltage line may be arranged in a same layer and made of a same material; and the present disclosure is not limited thereto.

In at least one embodiment of the present disclosure, the first voltage line may be made of the first source and drain metal layer or the second source and drain metal layer, and the present disclosure is not limited thereto.

In at least one embodiment shown in FIGS. 14, L42 and L32 may be arranged in a same layer and made of a same material, and L42 is electrically connected to the initialization voltage line in the active area through a jumper wire, to avoid a connection line between L42 and the initialization voltage line in the active area bonding with L32 so as to avoid short circuit.

Figure 15:
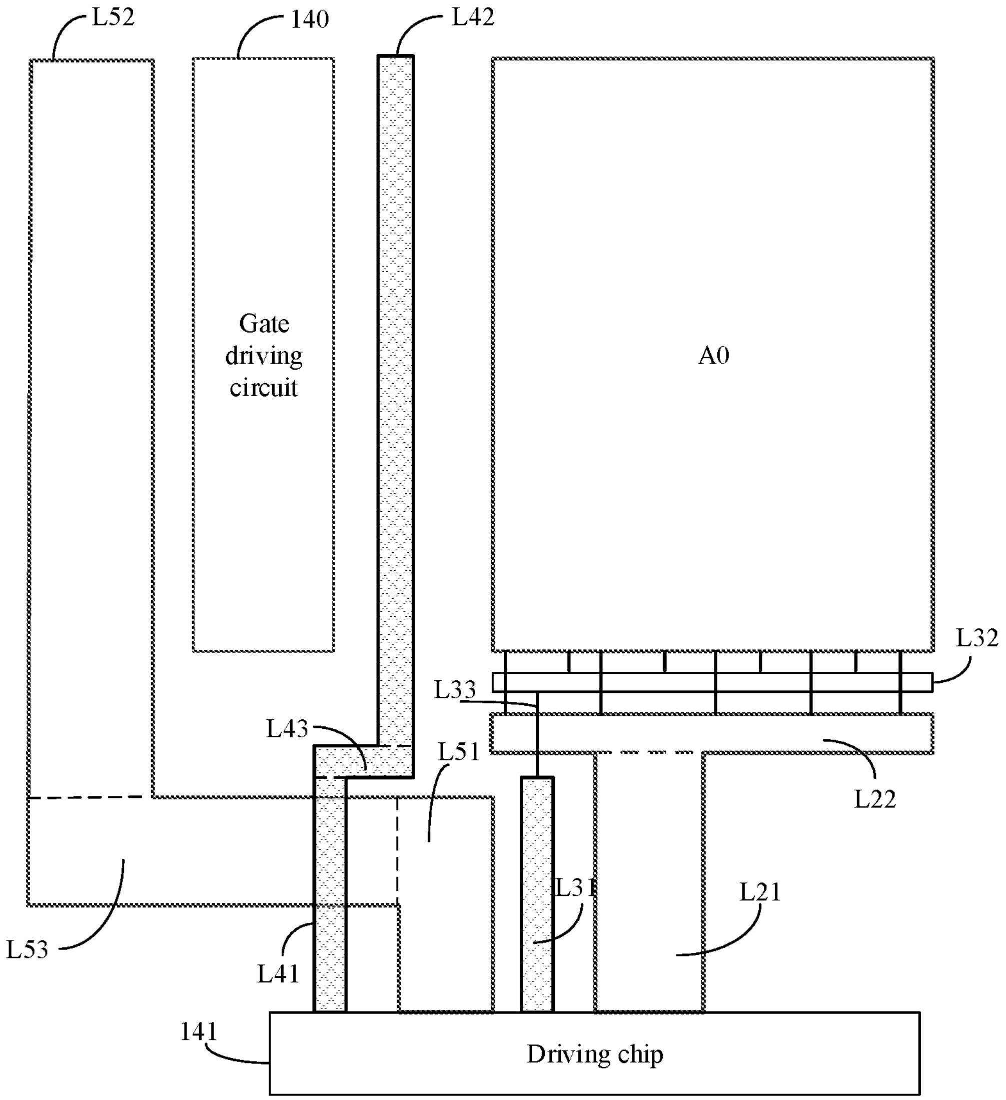
FIG. 15 is a structural diagram of a display device according to at least one embodiment of the present disclosure.

As shown in FIG. 15, when the extension direction of the initialization voltage line is the same as the extension direction of the gate line, and the extension direction of the initial data line is the same as the extension direction of the display data line (the extension direction of the gate line is the first direction, and the extension direction of the display data line is the second direction), the display substrate according to at least one embodiment of the present disclosure further includes the initial data wire, the initialization voltage wire, the gate driving circuit 140, the first voltage line and the second voltage wire that are arranged outside the active area A0.

The initial data wire is arranged below the active area A0 (that is, the initial data wire is arranged on the lower side of the display substrate).

The initial data wire includes the first initial data wire portion L31 extending along the second direction, the second initial data wire portion L32 extending along the first direction, and the third initial data wire portion L32 for electrically connecting L31 and L32; L33 extends in the second direction; L31 is directly electrically connected to the driving chip 141 to receive the second voltage signal provided by the driving chip 141.

The second voltage wire is arranged below the active area A0 (that is, the second voltage wire is arranged on the lower side of the display substrate), the second voltage wire includes the second voltage wire portion L22 extending along the first direction and the first voltage wire portion L21 extending in the second direction, the second voltage wire portion L22 is used to electrically connect the multiple voltage line portions included in the second voltage line, the first terminal of the first voltage wire portion L21 is electrically connected to the second voltage wire portion L22, and the second terminal of the first voltage wire portion L21 is directly electrically connected to the driving chip 141 to receive the second voltage signal provided by the driving chip 141; the second voltage wire portion L22 may be electrically connected to the voltage line portions included in the second voltage line in the active area A0 through jumper wires, so as to avoid short circuit caused by bonding with L32.

The initialization voltage wire includes the first initialization voltage wire portion L41 extending in the second direction, the second initialization voltage wire portion L42 provided on the left side of the active area A0, and the third initialization voltage wire portion L43 that is used for electrically connecting L41 and L42 and extends in the first direction; L41 is directly electrically connected to the driving chip 141, and the driving chip 141 is used to provide the initialization voltage to L41; L42 also extends in the second direction.

The gate driving circuit 140 is arranged on a side of L41 away from the active area A0; the gate driving circuit 140 may be electrically connected to multiple rows of gate lines.

The first voltage line includes the first voltage line portion L51 directly electrically connected to the driving chip 141, the second voltage line portion L52 provided on the left side of the active area A0, and the third initial data wire portion L53 for electrically connecting L51 and L52; L51 and L52 extend in the second direction, and L53 extends in the first direction; the driving chip 141 provides the first voltage signal to L51.

In actual operations, the first voltage line may be arranged on each of sides of the display substrate where the driving chip is not provided, and the first voltage line is electrically connected to the driving chip for receiving the first voltage signal provided by the driving chip; and the present disclosure is not limited thereto.

In addition, the initialization voltage wire and the second voltage wire may also be provided on the right side of the active area, and the present disclosure is not limited thereto.

The display device provided by the embodiments of the present disclosure may be any product or component with a display touch function, such as a mobile phone, a tablet computer, a television, a monitor, a notebook computer, a digital photo frame, a navigator, or the like.

The above descriptions illustrate preferred implementations of the present disclosure. It should be noted that for those skilled in the art, without departing from the principles of the present disclosure, various improvements and polishments may be made. These improvements and polishments shall fall within the protection scope of the present disclosure.

What is claimed is:

1. A display substrate, comprising a base substrate and a pixel circuit on the base substrate, wherein the pixel circuit comprises a driving circuit, a first light-emitting control circuit, a light-emitting element, a first initialization circuit, and a second initialization circuit;

wherein the driving circuit is configured to generate, under the control of a control terminal of the driving circuit, a driving current for driving the light-emitting element, and a cathode of the light-emitting element is electrically connected to a first voltage line;

wherein the first light-emitting control circuit is electrically connected to a light-emitting control line, the driving circuit, and an anode of the light-emitting element, and is configured to control, under the control of a light-emitting control signal provided by the light-emitting control line, the driving circuit to be connected to or disconnected from the anode of the light-emitting element;

wherein the first initialization circuit is electrically connected to a first initialization control line, the control terminal of the driving circuit, and an initialization voltage line, and is configured to write, under the control of a first initialization control signal provided by the first initialization control line, an initialization voltage provided by the initialization voltage line, to the control terminal of the driving circuit;

wherein the second initialization circuit is electrically connected to a second initialization control line, the anode of the light-emitting element, and an initial data line, and is configured to write, under the control of a second initialization control signal provided by the second initialization control line, an initial data voltage provided by the initial data line, to the anode of the light-emitting element; and the pixel circuit comprises a driving transistor and a storage capacitor, and the display substrate further comprises an initial data line on the base substrate;

wherein a gate electrode of the driving transistor is further used as a first electrode plate of the storage capacitor;

wherein the initial data line and the gate electrode of the driving transistor are in a same layer and are made of a same material, or, the initial data line and a second electrode plate of the storage capacitor are in a same layer and are made of a same material.

2. The display substrate according to claim 1, further comprising a gate line on the base substrate;

wherein an extension direction of the initial data line is the same as an extension direction of the gate line.

3. The display substrate according to claim 1, further comprising a display data line on the base substrate;

wherein the initial data line and the display data line are in a same layer and are made of a same material, or, the initial data line is on a side of the display data line facing away from the base substrate.

4. The display substrate according to claim 3, wherein an extension direction of the initial data line is the same as an extension direction of the display data line.

5. The display substrate according to claim 3, wherein the pixel circuit comprises a first transistor, and the display substrate further comprises the second initialization control line and the initial data line on the base substrate;

wherein a gate electrode of the first transistor and a gate electrode of the driving transistor are in a same layer and are made of a same material, and the gate electrode of the first transistor is electrically connected to the second initialization control line;

wherein a first electrode of the first transistor, a second electrode of the first transistor, a first electrode of the driving transistor, and a second electrode of the driving transistor are in a same layer and are made of a same material;

wherein the first electrode of the first transistor is electrically connected to the initial data line, and the second electrode of the first transistor is electrically connected to the anode of the light-emitting element.

6. The display substrate according to claim 1, wherein the pixel circuit comprises a driving transistor and a storage capacitor;

wherein a gate electrode of the driving transistor is further used as a first electrode plate of the storage capacitor;

wherein the initialization voltage line and the gate electrode of the driving transistor are in a same layer and are made of a same material, or, the initialization voltage line and a second electrode plate of the storage capacitor are in a same layer and are made of a same material.

7. The display substrate according to claim 6, further comprising a gate line on the base substrate;

wherein an extension direction of the initialization voltage line is the same as an extension direction of the gate line.

8. A display device, comprising a display substrate, wherein the display substrate comprises a base substrate and a pixel circuit on the base substrate, wherein the pixel circuit comprises a driving circuit, a first light-emitting control circuit, a light-emitting element, a first initialization circuit, and a second initialization circuit;

wherein the driving circuit is configured to generate, under the control of a control terminal of the driving circuit, a driving current for driving the light-emitting element, and a cathode of the light-emitting element is electrically connected to a first voltage line;

wherein the first light-emitting control circuit is electrically connected to a light-emitting control line, the driving circuit, and an anode of the light-emitting element, and is configured to control, under the control of a light-emitting control signal provided by the light-emitting control line, the driving circuit to be connected to or disconnected from the anode of the light-emitting element;

wherein the first initialization circuit is electrically connected to a first initialization control line, the control terminal of the driving circuit, and an initialization voltage line, and is configured to write, under the control of a first initialization control signal provided by the first initialization control line, an initialization voltage provided by the initialization voltage line, to the control terminal of the driving circuit;

wherein the second initialization circuit is electrically connected to a second initialization control line, the anode of the light-emitting element, and an initial data line, and is configured to write, under the control of a second initialization control signal provided by the second initialization control line, an initial data voltage provided by the initial data line, to the anode of the light-emitting element; and the display device further comprises a driving chip, an initial data wire, a first voltage line and a second voltage wire, wherein the initial data wire, the first voltage line and the second voltage wire are outside an active area of the base substrate;

wherein the initial data wire comprises a first initial data wire portion directly electrically connected to the driving chip;

wherein the first voltage line comprises a first voltage line portion directly electrically connected to the driving chip, and the second voltage wire comprises a first voltage wire portion directly electrically connected to the driving chip;

wherein the first initial data wire portion is between the first voltage line portion and the first voltage wire portion.

9. The display device according to claim 8, wherein the first initial data wire portion, the first voltage line portion, and the first voltage wire portion all extend in a second direction;

wherein the second direction is a direction in which the display data line extends.

10. The display device according to claim 8, further comprising a driving chip, an initial data wire, an initialization voltage wire, a first voltage line, and a second voltage wire, wherein the initial data wire, the initialization voltage wire, the first voltage line, and the second voltage wire are outside an active area of the base substrate;

wherein the initial data wire comprises a first initial data wire portion directly electrically connected to the driving chip;

wherein the initialization voltage wire comprises a first initialization voltage wire portion directly electrically connected to the driving chip;

wherein the first voltage line comprises a first voltage line portion directly electrically connected to the driving chip, and the second voltage wire comprises a first voltage wire portion directly electrically connected to the driving chip;

wherein the first initialization voltage wire portion, the first initial data wire portion, the first voltage line portion, and the first voltage wire portion are sequentially in a direction toward the active area.

* * * * *